(12) United States Patent
Wilke et al.

(10) Patent No.: US 6,581,755 B1
(45) Date of Patent: Jun. 24, 2003

(54) CONVEYOR BELT WITH CARRIER TISSUE IN WHICH CONDUCTIVE LOOPS ARE EMBEDDED

(75) Inventors: Helmut Wilke, Köln (DE); Daniel Cervera, Köln (DE)

(73) Assignee: Contitech Transportbandsysteme GmbH, Hannover (DE)

(*) Notice: Subject to any disclaimer, the term of this patent is extended or adjusted under 35 U.S.C. 154(b) by 0 days.

(21) Appl. No.: 09/743,769

(22) PCT Filed: Jul. 8, 1999

(86) PCT No.: PCT/EP99/04790

§ 371 (c)(1),
(2), (4) Date: Jan. 16, 2001

(87) PCT Pub. No.: WO00/03939

PCT Pub. Date: Jan. 27, 2000

(30) Foreign Application Priority Data

Jul. 16, 1998 (DE) .......................................... 198 31 854

(51) Int. Cl.[7] .............................................. B65G 43/00
(52) U.S. Cl. .......................... 198/810.03; 198/810.02; 198/810.04; 198/957
(58) Field of Search ........................ 198/810.02, 810.03, 198/810.04, 957

(56) References Cited

U.S. PATENT DOCUMENTS

| | | | |
|---|---|---|---|
| 3,731,113 A | * 5/1973 | Lowe et al. ................ 198/40 |
| 3,834,524 A | 9/1974 | Ratz et al. | |
| 3,899,071 A | * 8/1975 | Duffy ........................ 198/232 |
| 3,922,661 A | * 11/1975 | Enabnit et al. ............ 198/232 |
| 4,296,855 A | * 10/1981 | Blalock ..................... 198/502 |
| 4,621,727 A | * 11/1986 | Strader ...................... 198/810 |
| 4,653,633 A | * 3/1987 | Jacobs ....................... 198/810 |
| 4,854,446 A | * 8/1989 | Strader ...................... 198/810 |
| 5,168,266 A | * 12/1992 | Fukuda ...................... 198/810 |
| 5,614,063 A | * 3/1997 | Graf et al. ................. 162/263 |
| 6,047,814 A | * 4/2000 | Alles et al. ............ 198/810.02 |
| 6,127,822 A | * 10/2000 | Sasahara et al. ............ 324/209 |
| 6,158,576 A | * 12/2000 | Eagles et al. .......... 198/810.01 |
| 6,172,344 B1 | * 1/2001 | Gordon et al. .............. 219/529 |
| 6,264,577 B1 | * 7/2001 | Hutchins ............... 198/810.02 |
| 6,341,501 B2 | * 1/2002 | Istook ...................... 66/172 E |
| 6,352,149 B1 | * 3/2002 | Gartland ................ 198/810.02 |

FOREIGN PATENT DOCUMENTS

| | | |
|---|---|---|
| DE | 4444262 | 4/1996 |
| DE | 19601899 | 3/1997 |
| DE | 296 04 039 | 7/1997 |
| DE | 196 52 236 | 6/1998 |
| FR | 2146366 | 3/1973 |

* cited by examiner

Primary Examiner—Douglas Hess
(74) Attorney, Agent, or Firm—Walter Ottesen

(57) ABSTRACT

The invention relates to a belt, strap, conveyor belt (20) having a support fabric (2) in which at least one electrically conductive loop (4) is embedded. The conductive loop is sewn onto the support fabric (2), so that even conveyor belts (20) which have an extremely thin cover layer (22) can be provided with conductive loops.

16 Claims, 2 Drawing Sheets

CONVEYOR BELT WITH CARRIER TISSUE IN WHICH CONDUCTIVE LOOPS ARE EMBEDDED

FIELD OF THE INVENTION

The invention relates to a belt, strap, conveyor belt having at least one support fabric in which at least one electrically conductive loop is embedded. The invention relates also to a method of manufacturing such a belt, strap, conveyor belt.

BACKGROUND OF THE INVENTION

Embedding continuous conductive loops in belts, straps, conveyor belts, et cetera for different monitoring purposes has been known for a long time. Conductive loops of this type are embedded particularly in continuous conveyor belts and the current flow generated in the conductive loops in an inductive manner is used to constantly monitor the moved conveyor belt and for example to recognize early damage, especially longitudinal tears, caused for example by foreign bodies penetrating. In the recent past it has also been proposed to allocate to each conductive loop in the conveyor belt a transponder, comprising an integrated circuit which is connected in a conductive manner to a coil. In this case, the conductive loops are supplied with energy in an inductive manner by a device situated outside the conveyor belt, which energy they, in turn, couple in an inductive manner to the transponders allocated to them. In the reverse direction, the transponders transmit an individual identifier stored in their circuits to the device. From the reception of the signal, the external device assesses the soundness of the conductive loop or of the transponder and thus the soundness of the conveyor belt in the region of the conductive loop. Conversely, if the individual identifier is not transmitted, it is concluded that there is damage of the conductive loop and thus damage of the conveyor belt in the region of the conductive loop (see also DE 44 44 262 where a monitoring system of this type is described in detail).

SUMMARY OF THE INVENTION

The above remarks show that reliable monitoring with the aid of conductive loops is only possible if the failure of a conductive loop can only be traced back to damage of the belt, strap, conveyor belt etc. Thus special importance attaches to the resistance of the conductive loops to everyday loads. In addition, conductive loops for monitoring purposes are also intended to be embedded in particularly thin conveyor belts, which have as the strength support at least one support fabric in the form of a textile ply and are only covered by a very thin elastomer cover layer. It is obvious that the demands made of the conductive loop, namely high durability and the possibility of being embedded in conveyor belts having a support fabric and an extremely thin cover layer, are opposed to one another.

From DE 196 01 899 C1, it is known to produce the conductive loops from an electrically conductive foil and to embed them in a conveyor belt. The conductive loops have a thickness of between 20 μm and 200 μm, so that they are also suitable for embedding in conveyor belts having extremely thin cover layers. If the conveyor belt has steel cables as strength support, it has been shown that the conductive loops can also resist high mechanical everyday bending and tensile loads. However, if the conveyor belt has one or more support fabrics as strength support, it has been shown that the conductive loops can only resist normal everyday bending and tensile loads, but can tear with high tensile loads even though these do not yet lead to damage of the conveyor belt. This can probably be traced back to the fact that with high tensile loads there can be stretching of the support fabric and thus stretching of the conductive loops which can lead to splitting of the conductive loops.

The object underlying the invention is to create a belt, strap, conveyor belt, et cetera (especially having at least one support fabric as the strength support), which on the one hand has a thin cover layer and on the other hand can be reliably monitored by embedded conductive loops. The object underlying the invention is also to create a method of manufacturing such a belt, strap, conveyor belt etc.

According to the invention this object is accomplished in that at least a portion of the electrically conductive loop is sewn onto the support fabric.

According to another embodiment of invention the object is in addition accomplished in that first a commercially available support fabric, known per se, is produced, onto which subsequently the electrically conductive loops are sewn, and that the belt, strap, conveyor belt, et cetera is completed in a manner known per se using the support fabric prepared in this manner. If the support fabric is to be embedded in a two-ply belt, it is preferably gummed onto the support fabric before the conductive loop is sewn on. If, however, the support fabric is to be embedded in a one-ply belt, it is preferably saturated with a PVC paste before the conductive loop is sewn onto the support fabric.

According to a further embodiment of the invention the object is accomplished in addition in that first a support fabric is produced which contains electrically conductive threads at a spacing from one another, of which subsequently respectively two are connected to form an electrically conductive loop by sewing on an electrically conductive seam, and in that the belt, strap, conveyor belt, et cetera is completed in a manner known per se using the support fabric prepared in this manner. Before the electrically conductive seams are sewn on, the support fabric can be treated as per the previous paragraph.

According to another embodiment of the invention the object is accomplished in addition in that first the loop 4 is sewn onto a grid-like support fabric, and in that the support fabric prepared in this manner is introduced into the conveyor belt blank at any position, and the conveyor belt is completed in a manner known per se.

The basic idea of the invention can be seen in the fact that the conductive loops consist of threads which are sewn directly onto the support fabric like a seam, or which are already contained in the support fabric. The conductive loops thus consist of a material which has very similar or identical deformation properties to the threads of the support fabric.

The advantages of the invention can be seen in particular in the fact that even belts, straps, conveyor belts, et cetera, which have at least one support fabric as strength support and an extremely thin cover layer, can be provided with conductive loops. It has been shown that even conveyor belts, which have a cover layer with a thickness of ≦6 mm, can be provided with conductive loops. Nevertheless the conductive loops embedded in the conveyor belt resist high mechanical loads, in particular tensile loads. This can be traced back to the fact that the conductive loops consisting of threads have (practically) the same deformation properties as the threads of the support fabric such that the stretching of the support fabric is transferred to the conductive loops.

The advantages of the manufacturing method according to the invention can be seen in particular in the fact that, through the production of a commercially available support fabric in a first method step, a high flexibility in the manufacture of the conveyor belts is achieved. Thus, the commercially available support fabric can be intermediately stored and it is possible to react flexibly to customers' wishes with respect to equipping conveyor belts with conductive loops, since the conductive loops are sewn only subsequently onto the support fabric.

The advantages of the method according to the further embodiment can be seen in particular in the fact that components of the conductive loops are incorporated in the support fabric already during the manufacture of the support fabric. The electrically conductive threads which are present in the support fabric merely have to be subsequently connected to one another to be conductive, so that the complexity for subsequent sewing is reduced.

The advantages of the method according to the further embodiment can be seen in particular in the fact that through the method, even belts, straps, conveyor belts etc. with a metallic tension carrier can be provided with conductive loops in a simple manner.

According to a first embodiment of the invention, the support fabric contains electrically conductive threads which run largely in the transverse direction of the support fabric, and of which respectively two are connected to one another by electrically conductive threads sewn onto the support fabric.

According to an alternative embodiment of the invention, the complete conductive loops are entirely sewn onto the support fabric of the conveyor belt. Here, a galvanized or coppered steel wire can be used as the thread which forms the electrically conductive loop in the seam. The use of a steel wire has the advantage of high strength and high flexibility, such that the conductive loop can particularly well "go along with" stretching of the conveyor belt under tensile load and thus stretching of the support fabric. It has emerged that a galvanized steel wire has sufficient electrical conductivity. Particularly good electrical conductivity can, however, be achieved in that the steel wire is covered with a copper coating.

Alternatively, a copper wire can be used as the thread which forms the electrically conductive loop in the seam. The advantage of this development can be seen in the fact that a copper wire has optimum conductivity. Independently of the material of which the thread consists, which forms the electrically conductive loop in the seam, the other threads used in sewing on the conductive loop do not have to consist of an electrically conductive material. Rather, polyester threads can be used, for example, as additional threads.

According to a development of the invention, the thread which forms the conductive loop in the seam has a plurality of fibrils, preferably 3 to 20 fibrils, and thus particularly high flexibility. The advantage of this development can be seen in the fact that conductive loops formed from threads of this kind can absorb particularly high mechanical tensile loads. If a thread with a plurality of fibrils is used, some fibrils are preferably formed from copper and the remaining fibrils of the thread from steel, such that, on the one hand, there is good electrical conductivity (as a result of the copper portion) and, on the other hand, there is good strength and flexibility (as a result of the steel portion) of the thread.

According to a further development of the invention, the threads used to form the conductive loop have a diameter of between 0.1 and 1 mm. The advantage of this development can be seen in the fact that threads having such a diameter can be handled by commercially available sewing machines without any problems.

According to a further development of the invention, the two ends of a conductive loop sewn onto the support fabric are connected to one another by a covering seam which is led, starting from one end of the conductive loop, in a zigzag line or in a line similar to a zigzag line over the other end of the conductive loop. Through such a covering seam it can be guaranteed in a simple manner that the two ends of the conductive loop are electrically conductively connected to one another.

According to a further development of the invention, the conductive loops have a spiraled portion. The advantage of this development can be seen in the fact that the conductive loops can even better absorb length alterations of the support fabric without being destroyed. To achieve this advantage, when the conductive loop is sewn onto the support fabric, sewing methods are used in which spiraling of the thread is produced automatically by the guiding of the thread.

According to a further development of the invention, each conductive loop embedded in the belt, strap, conveyor belt etc. is operationally connected to an associated transponder, such that a monitoring system can be operated such as is described in detail, for example, in DE 44 44 262.

BRIEF DESCRIPTION OF THE DRAWINGS

An embodiment and further advantages of the invention are explained in conjunction with the following figures, as follows.

DESCRIPTION OF THE PREFERRED EMBODIMENTS OF THE INVENTION

Figure 1:
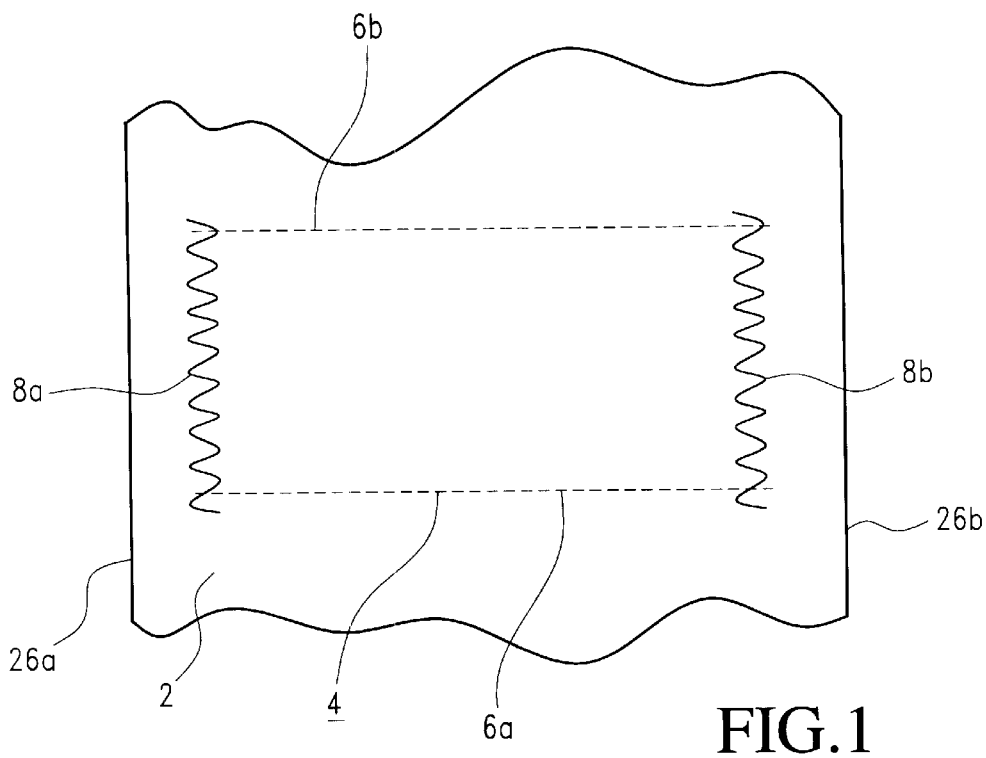
FIG. 1 is a support fabric in plan view.

FIG. 1 shows a support fabric 2, in which electrically conductive threads 6a and 6b have been already incorporated during manufacture, which threads preferably run in the transverse direction of the support fabric 2. The electrically conductive threads 6a and 6b, at a spacing from one another, are connected to one another in an electrically conductive manner by the covering seams 8a and 8b which run close and parallel to the fabric edges 26a and 26b. The covering seams 8a and 8b are sewn onto the support fabric 2. The length which is covered by the covering seams 8a and 8b is somewhat greater than the mutual spacing of the electrically conductive threads 6a and 6b, such that it is ensured that the covering seams 8a and 8b connect the electrically conductive threads 6a and 6b electrically to one another. The electrically conductive threads 6a and 6b and the covering seams 8a and 8b form a conductive loop 4 on the support fabric 2. Conductive loops 4 formed in this manner are located at a spacing from one another on the support fabric 2.

Figure 2:
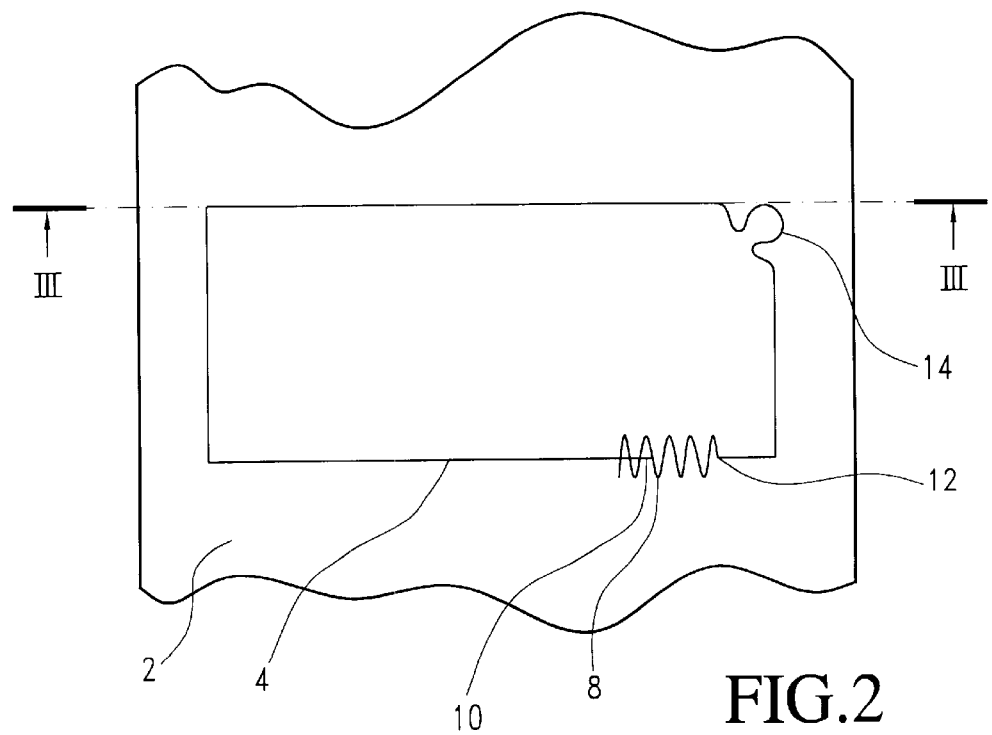
FIG. 2 is a support fabric in plan view.

FIG. 2 also shows a support fabric 2 onto which the complete conductive loop 4 has been sewn entirely in the form of a seam (comparable with a seam with which, for example, a patch is sewn onto a piece of material). The two ends 10 and 12 of the conductive loop 4 are connected to one another by a covering seam 8 which is led, starting from end 12 of the conductive loop 4, in a zigzag line or in a line similar to a zigzag line over the other end 10 of the conductive loop 4 onto the conductive loop 4. The covering seam 8 bridges a length which is greater than the mutual spacing of the two ends 10 and 12 of the conductive loop 4.

Through the zigzag course of the covering seam 8 it is guaranteed that, proceeding from the end 12 of the conductive loop 4, the end 10 of the conductive loop 4 is "met". Preferably, the conductive loop 4 consists merely of one thread and from the end 12 of the conductive loop 4 this thread merges into the covering seam 8 which produces the contact closure of ends 10 and 12 of the conductive loop 4. Alternatively, it is also possible to configure the covering seam 8 as a separate electrically conductive thread, such as is also shown in FIG. 1; however, then an additional method step is necessary to complete the conductive loop 4 on the support fabric 2.

The conductive loop 4 can possibly contain a bulge 14. Above or below this bulge 14, there can be disposed in the finished conveyor belt a transponder, comprising an integrated circuit, a coil and conductive connections from the coil to the integrated circuit, in such a manner that a particularly good communication between the transponder and the conductive loop 4 is possible. For more detailed explanations, reference is made in this connection to DE 44 44 262.

The support fabric shown in FIG. 2 can also contain a plurality of conductive loops 4 at a spacing from one another. It is also possible to cut individual pieces from the support fabrics as per FIGS. 1 and 2, which each contain a conductive loop 4. Ready-made conductive loops 4 of this kind can be introduced into the cover layer of a conveyor belt 20 of any construction, even if this cover layer is extremely thin. In particular, the individual conductive loops can also be introduced into the cover layer of conveyor belts 20 with metallic tension carriers.

Figure 3:
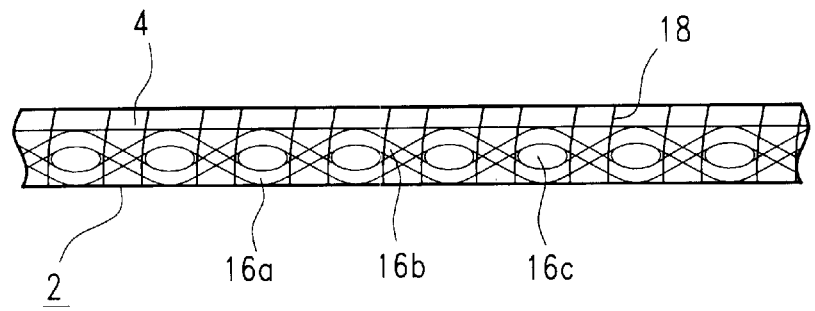
FIG. 3 is a support fabric in cross section.

FIG. 3 shows a cross section through the support fabric along the line III—III shown in FIG. 2. The support fabric 2 comprises threads 16a, 16b and 16c. The conductive loop 4 is sewn onto the support fabric 2 with the aid of the thread 18. Here, the conductive loop 4 forms the lower thread and the sewing thread 18 forms the upper thread, that is, the sewing thread 18 is "twined round" the conductive loop 4. The complete seam thus comprises the conductive loop 4 and the sewing thread 18. As the lower thread or conductive loop 4, for example, a galvanized or coppered steel wire can be used. Alternatively, it is possible to use a copper wire. The steel wire or the copper wire contains preferably a plurality of fibrils, preferably 3 to 20 fibrils. It is also possible to configure the conductive loop 4 as a wire which contains both fibrils of copper and fibrils of steel. In each case, the conductive loop 4 preferably has a diameter of between 0.1 and 1 mm. The sewing thread 18 can be formed either as a textile or metal thread, since it does not need to contribute to the electrical conductivity of the conductive loop 4.

The support fabrics shown in FIGS. 1 to 3 can be embedded in a conveyor belt in a manner known per se during the manufacture of the belt.

Figure 4:
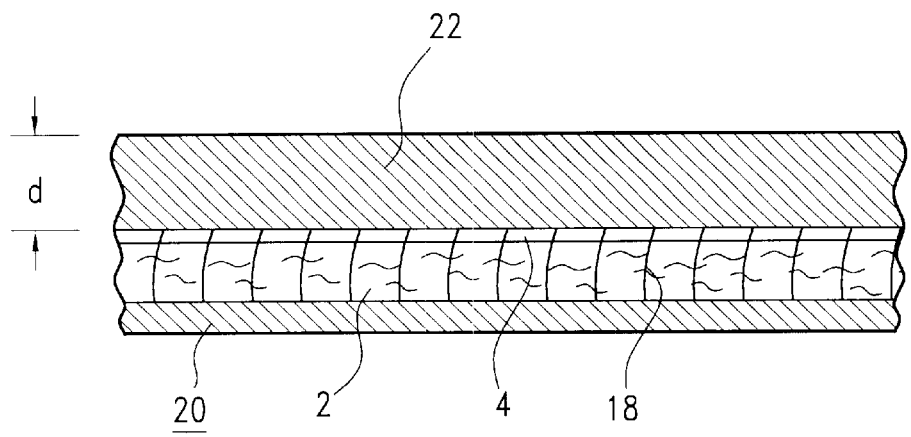
FIG. 4 is a conveyor belt in cross section.

FIG. 4 shows a one-ply conveyor belt 20 in which a textile ply 2 is embedded. The textile ply 2 is constructed as shown in FIG. 3, the threads 16a, 16b and 16c being merely indicated in FIG. 4. The conductive loop 4 is sewn onto the support fabric 2 with the aid of the sewing thread 18 in the same way as has been explained in conjunction with FIG. 3. The conveyor belt 20 can have an extremely thin cover layer 22 with a thickness d<6 mm.

Figure 5:
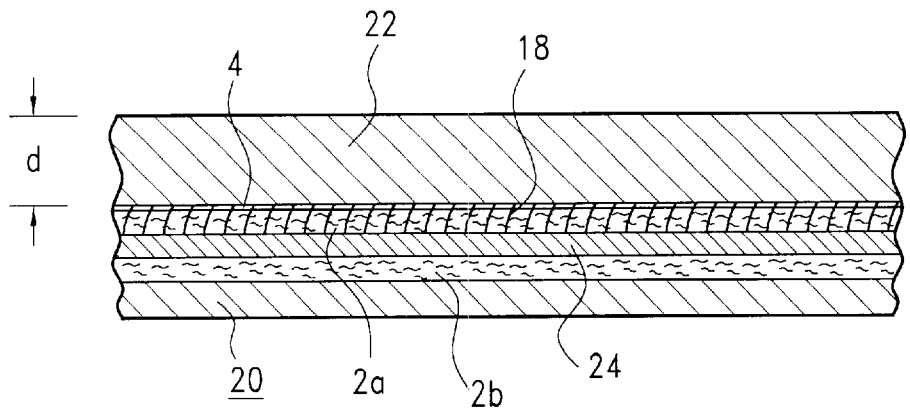
FIG. 5 is a conveyor belt in cross section.

FIG. 5 shows a multi-layer, especially two-ply conveyor belt in cross section, which has two support fabrics 2a and 2b, which are separated from one another by a layer 24, preferably by a rubber layer 24. In FIG. 5, also, the threads 16a, 16b and 16c of the support fabrics 2a and 2b are only indicated. The support fabric 2a is constructed exactly as has been already explained in conjunction with FIG. 3. A multi-layer conveyor belt 20 can also have an extremely thin cover layer 22 with a thickness $d \leq 6$ mm because of the application according to the invention of the conductive loop 4 to the support fabric 2a.

In the conveyor belt shown in FIG. 4, the conductive loop is orientated towards the cover layer 22. It is also possible to so construct the conveyor belt that the conductive loop 4 is orientated towards layer 24 and then lies between the support fabrics 2a and 2b. The advantage of such a structure can be seen in the fact that the conductive loop 4 lies closer to the neutral fiber, such that less bending and tensile stress acts on the conductive loop 4. In addition thereto, the conductive loop 4 is in this case protected by the support fabrics 2a and 2b against impact on the conveyor belt.

List of Reference Numerals

| | |
|---|---|
| 2 | support fabric |
| 4 | conductive loop |
| 6a, 6b | electrically conductive threads |
| 8a, 8b | covering seam |
| 10, 12 | ends of the conductive loop |
| 14 | bulge |
| 16a, 16b, 16c | threads |
| 18 | sewing thread |
| 20 | conveyor belt |
| 22 | covering plate |
| 24 | layer |
| 26a, 26b | fabric edges |

What is claimed is:

1. A belt or conveyor belt including an elongated flexible member, the belt or conveyor belt comprising:
    at least one support fabric embedded in said elongated flexible member;
    an electrically conductive loop attached to said support fabric; and,
    at least a portion of said electrically conductive loop being sewn onto the support fabric.

2. The belt or conveyor belt of claim 1, wherein said electrically conductive loop includes at least two electrically conductive first thread segments contained in said support fabric at a spacing from each other; two electrically conductive second thread segments connected to said first thread segments so as to close said conductive loop; and, said two second segments are sewn to said support fabric.

3. The belt or conveyor belt of claim 2, wherein said flexible member defines a longitudinal axis and is movable in the direction of said longitudinal axis; and, said first thread segments extend transversely to said axis and said second thread segments extend in a direction parallel to said axis.

4. The belt or conveyor belt of claim 1, wherein the complete electrically conductive loop is entirely sewn onto said support fabric thereby forming a seam.

5. The belt or conveyor belt of claim 4, wherein a galvanized or coppered steel wire is used as a thread which is sewn to form the electrically conductive loop as said seam.

6. The belt or conveyor belt of claim 5, wherein the wire contains a plurality of fibrils, preferably 3 to 20 fibrils.

7. The belt or conveyor belt of claim 5, wherein the wire has a diameter of between 0.1 and 1 mm.

8. The belt or conveyor belt of claim 4, wherein a copper wire is used as a thread which is sewn to form the electrically conductive loop as said seam.

9. The belt or conveyor belt of claim 4, wherein said electrically conductive loop is formed by an electrically conductive thread sewn into said support fabric to form said seam; and, said thread is a wire which contains both fibrils of copper and fibrils of steel.

10. The belt or conveyor belt of claim 4, wherein said electrically conductive loop includes an open loop having first and second end portions; and, said first end portion has a configuration defining a zigzag line placed over said second end portion to form a covering seam.

11. The belt or conveyor belt of claim 1, wherein the electrically conductive loop has a spiraled portion.

12. The belt or conveyor belt of claim 1, wherein said electrically conductive loop is operationally connected to a transponder.

13. The belt or conveyor belt of claim 1, wherein said electrically conductive loop is completely embedded in said elongated flexible member.

14. A method of making a belt or conveyor belt which includes an elongated flexible member, the flexible member having at least one support fabric embedded therein, the method comprising the steps of:

providing said support fabric;

sewing electrically conductive loops onto said support fabric; and, embedding said support fabric with said conductive loops between cover layers.

15. A method of making a belt or conveyor belt which includes an elongated flexible member, the method comprising the steps of:

providing a support fabric which contains at least two electrically conductive first thread segments at a spacing from each other;

sewing two electrically conductive second thread segments to said support fabric and connecting said second thread segments to said first thread segments to form an electrically conductive loop; and, embedding said support fabric with said conductive loop between cover layers.

16. A method of making a belt or conveyor belt which includes an elongated flexible member, the belt having a metallic tension carrier, the method comprising the steps of:

providing a grid-like support fabric;

sewing an electrically conductive loop onto said grid-like support fabric; and, introducing said support fabric prepared in this manner into an elongated flexible piece of raw material at any location thereon.

* * * * *